Patented Jan. 4, 1949

2,458,232

UNITED STATES PATENT OFFICE 2,458,232

SOLDERING FLUX

Albert L. Wells, Atlanta, Ga.

No Drawing. Application June 17, 1948,
Serial No. 33,661

2 Claims. (Cl. 148—23)

My invention relates to a new and improved soldering flux.

The primary object of my invention is to provide a soldering flux which is highly efficient in preparing metallic surfaces for soldering and which can be used without the necessity of a preliminary cleaning of the metallic surfaces to be soldered.

Another object is to provide a flux which attacks the oxides and sulfates on metallic surfaces by a cascade reaction.

A further object of the invention is to provide a soldering flux which can be effectively used on all metals which are capable of being bonded by common soft solders of the tin-lead type.

My new and improved soldering flux consists essentially of a concentrated aqueous solution of certain metallic salts of technical purity blended with a small amount of methyl salicylate. The flux can be used for cleaning any of the metals which are capable of being joined by soft solders such as iron, steel, zinc, copper, brass, bronze, nickel, Monel metal and cast iron. Surfaces of these metals may be prepared for soldering without any preliminary cleaning operation even though they may be covered with dirt, grease or corrosion. The flux is not effective when used on alloys containing aluminum or antimony.

The relative concentrations of the metallic salts are carefully controlled and balanced to provide a cascade reaction on the oxides, sulfates or other corrosion products on the surfaces to be soldered.

I have found that the proportions of the various components must be controlled within close limits, and that the manner of compounding the flux composition is important in obtaining the advantages of my invention. I describe below a procedure for preparing one gallon of the flux composition, it being understood that greater or lesser amounts may be prepared by following the same procedure by increasing or decreasing the respective amounts of the ingredients.

I first add ¾ ounces of lead chloride to one quart of warm water. I then add four ounces of cadmium chloride while stirring briskly. The cadmium chloride becomes fully dissolved in the warm water, but the lead chloride remains in suspension. I next place ½ pound of anhydrous stannic chloride and one quart of boiling water in separate containers and simultaneously add them to the foregoing solution. There results a clear solution, it being apparent that the lead chloride has become dissolved, and I have found that the lead chloride will remain in solution. I then add one pound of ammonium chloride, stirring until the ammonium chloride is completely dissolved. I next add two pounds of zinc chloride, again stirring until the zinc chloride has become completely dissolved.

I next blend one ounce of methyl salicylate into the solution by adding it slowly while stirring. The methyl salicylate serves to reduce the surface tension of the flux, permitting adhesion of the flux to metallic surfaces. As the final step, I add sufficient water to make a total of one gallon of the solution. The water which is last added to the solution may be colored with methylene blue or other coloring matter, but this is not in any sense essential. The sole purpose of the coloring matter is to give the flux composition a distinctive color or to aid in identification.

I have found that the several ingredients of the composition remain in solution indefinitely and that the effectiveness of the flux is not affected by storage for any reasonable period of time.

I have found that my soldering flux can be used effectively in preparing galvanized iron for soldering. This metal has heretofore been difficult to solder and has necessitated the use of free acids for a preliminary cleaning operation. No preliminary cleaning operation is necessary when using my soldering flux on galvanized iron or on any of the other metals mentioned above for which the flux is suitable.

Rust is effectively removed from iron and steel merely by applying my flux. The pits which are left after removal of the rust from the iron or steel appear to receive a deposit of metallic tin which provides an ideal surface for bonding with the solder. The oxides and sulfates of copper and zinc are rapidly flushed away by the flux, leaving surfaces which make a strong bond with the solder.

My soldering flux contains no free acids and it is not harmful to the skin. The composition is poisonous if taken internally. The use of my flux eliminates cankering of the metals at soldered joints. I recommend the use of my flux sparingly for reasons of economy although the use of excessive quantities is not injurious to the metals.

Having thus described my invention, I claim:

1. A flux composition consisting essentially of the following components in substantially the proportions stated:

Zinc chloride _____ pounds __ 2
Ammonium chloride _____ do ____ 1
Stannic chloride _____ do ____ ½
Cadmium chloride _____ do ____ ¼
Lead chloride _____ ounce __ ¾
Methyl salicylate _____ do ____ 1
Water sufficient to make one gallon of solution.

2. The method of preparing a flux composition which comprises adding ¾ ounce lead chloride to one quart warm water, then adding 4 ounces cadmium chloride and stirring briskly until the cadmium chloride becomes dissolved, the lead chloride remaining in suspension, then simultaneously adding ½ pound anhydrous stannic chloride and one quart boiling water whereupon the lead chloride becomes dissolved, then adding 1 pound ammonium chloride and stirring, until completely dissolved, then adding 2 pounds zinc chloride with additional stirring until completely dissolved, blending 1 ounce methyl salicylate into the solution and then adding sufficient water to make a total of 1 gallon.

ALBERT L. WELLS.

REFERENCES CITED

The following references are of record in the file of this patent:

UNITED STATES PATENTS

| Number | Name | Date |
|---|---|---|
| 1,929,895 | McBride | Oct. 10, 1933 |
| 2,440,592 | MacDougall et al. | Apr. 27, 1948 |